United States Patent
Sumitomo

(10) Patent No.: US 9,563,241 B2
(45) Date of Patent: *Feb. 7, 2017

(54) POWER SUPPLY DEVICE INCLUDING AN ELECTRO-CONDUCTIVE CABLE WOUND AROUND AN INDUCTOR OR OUTPUT CAPACITOR

(71) Applicant: Rohm Co., Ltd., Kyoto (JP)

(72) Inventor: Hironori Sumitomo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 178 days.

This patent is subject to a terminal disclaimer.

(21) Appl. No.: 14/494,708

(22) Filed: Sep. 24, 2014

(65) Prior Publication Data

US 2016/0085284 A1    Mar. 24, 2016

(51) Int. Cl.
| | | |
|---|---|---|
| G05F 1/00 | (2006.01) | |
| G06F 1/26 | (2006.01) | |
| G05F 1/10 | (2006.01) | |
| G05F 1/575 | (2006.01) | |
| H02M 3/155 | (2006.01) | |

(52) U.S. Cl.
CPC . *G06F 1/26* (2013.01); *G05F 1/10* (2013.01); *G05F 1/575* (2013.01); *H02M 3/155* (2013.01)

(58) Field of Classification Search
CPC ......... G06F 1/3206; G06F 1/32; H02M 3/155; G05F 1/575
USPC ........................................................ 323/271
See application file for complete search history.

(56) References Cited

U.S. PATENT DOCUMENTS

| | | | | |
|---|---|---|---|---|
| 4,243,918 A | * | 1/1981 | Meise | G06G 7/184 315/389 |
| 5,677,602 A | * | 10/1997 | Paul | H05B 41/2881 315/224 |
| 5,770,940 A | * | 6/1998 | Goder | G05F 1/565 323/282 |
| 5,850,139 A | * | 12/1998 | Edwards | G05F 1/575 323/280 |
| 6,215,288 B1 | | 4/2001 | Ramsey | |
| 8,411,476 B2 | * | 4/2013 | Christensen | H02M 3/33507 363/16 |

(Continued)

FOREIGN PATENT DOCUMENTS

| | | |
|---|---|---|
| JP | 2014-78679 | 5/2014 |
| JP | 2014-82924 | 5/2014 |
| JP | 2014-099995 | 5/2014 |

OTHER PUBLICATIONS

USPTO, Office Action mailed May 16, 2016 in U.S. Appl. No. 14/494,744.

*Primary Examiner* — Jessica Han
*Assistant Examiner* — Lorena Bruner
(74) *Attorney, Agent, or Firm* — Fish & Richardson P.C.

(57) ABSTRACT

A power supply device disclosed in the present specification has an output portion which generates an output voltage from an input voltage by means of on-off control of an output transistor and feeds the output voltage to a load, an output feedback controller which drives the output portion by performing output feedback control, and a detector which detects, by means of an electromagnetic induction method, a ripple component in a monitoring target current resulting from the on-off control of the output transistor. The output feedback controller performs the output feedback control based on the result of detection by the detector.

20 Claims, 18 Drawing Sheets

(56) References Cited

U.S. PATENT DOCUMENTS

| | | | |
|---|---|---|---|
| 2008/0012546 A1* | 1/2008 | Nagaya | H02M 3/1588 |
| | | | 323/282 |
| 2010/0237845 A1* | 9/2010 | Scaldaferri | H02J 7/0052 |
| | | | 323/299 |
| 2013/0038308 A1* | 2/2013 | Sumitomo | H02M 3/156 |
| | | | 323/283 |
| 2014/0077714 A1 | 3/2014 | Suzuki | |
| 2014/0085949 A1 | 3/2014 | Sugawara | |
| 2016/0085251 A1 | 3/2016 | Sumitomo | |

* cited by examiner

POWER SUPPLY DEVICE INCLUDING AN ELECTRO-CONDUCTIVE CABLE WOUND AROUND AN INDUCTOR OR OUTPUT CAPACITOR

BACKGROUND OF THE INVENTION

1. Field of the Invention

The present invention relates to a power supply device.

2. Description of Related Art

Power supply devices (switching regulator, LDO [low drop out] regulator and the like), which generate a desired output voltage from an input voltage and supply the output voltage to a load, are used in various kinds of applications.

As an output feedback method of a power supply device, voltage mode control is general, which detects a change in an output voltage by means of an error amplifier, a comparator or the like and, based on the detection result, controls power transistors (output transistor and synchronization rectification transistor). However, in the voltage mode control, a phase delay occurs because of an output capacitor; accordingly, there is a problem that a load response is low. In the meantime, if an output capacitor having large ESR [equivalent series resistance] is used, it is possible to reduce the phase delay and raise the load response. However, the larger the ESR of the output capacitor becomes, the larger the output ripple becomes; accordingly, there is a risk of impairing output stability.

Besides, as an output feedback method having a high load response, current mode control is known, which uses a ripple component of an inductor current to control a power transistor. In the meantime, as methods for detecting an inductor current, general methods include: a method which inserts a sense resistor in a route where an inductor current flows; and a method which uses on-resistance of a power transistor. However, there are problems that in the method which inserts a sense resistor, an unnecessary power loss occurs; and in the method which uses on-resistance of a power transistor, accuracy of detecting an inductor current deteriorates.

Besides, in both the voltage mode control and the current mode control, a cut-off frequency of an output feedback loop is curbed to about 1/5 to 1/10 of a switching frequency in light of stability of a system, and critical inductance resides in the system. Accordingly, there are problems that it is impossible to sharply change an inductor current and a long time is required until an output current reaches a desired value at a load sudden change.

SUMMARY OF THE INVENTION

In light of the above problems found by the inventor of the present application, it is a main object of the invention disclosed in the present specification to provide a power supply device that has a high load response.

A power supply device disclosed in the present specification includes: an output portion that generates an output voltage from an input voltage and supplies the output voltage to a load; an output feedback controller that drives the output portion by performing output feedback control; and a first detector that detects, by means of an electromagnetic induction method, a change in a first monitoring target current due to a load change; wherein the output feedback controller reflects a detection result from the first detector into the output feedback control.

Besides, a power supply device disclosed in the present specification includes: an output portion that generates an output voltage from an input voltage by means of on-off control of an output transistor and supplies the output voltage to a load; an output feedback controller that drives the output portion by performing output feedback control; and a detector that detects, by means of an electromagnetic induction method, a ripple component of a monitoring target current due to the on-off control of the output transistor; wherein the output feedback controller performs the output feedback control by using a detection result from the detector.

In the meantime, other features, elements, steps, advantages and characteristics of the present invention will become more apparent from the following detailed description of preferred embodiments with reference to the relevant attached drawings.

DESCRIPTION OF THE PREFERRED EMBODIMENTS

First Embodiment

Figure 1:
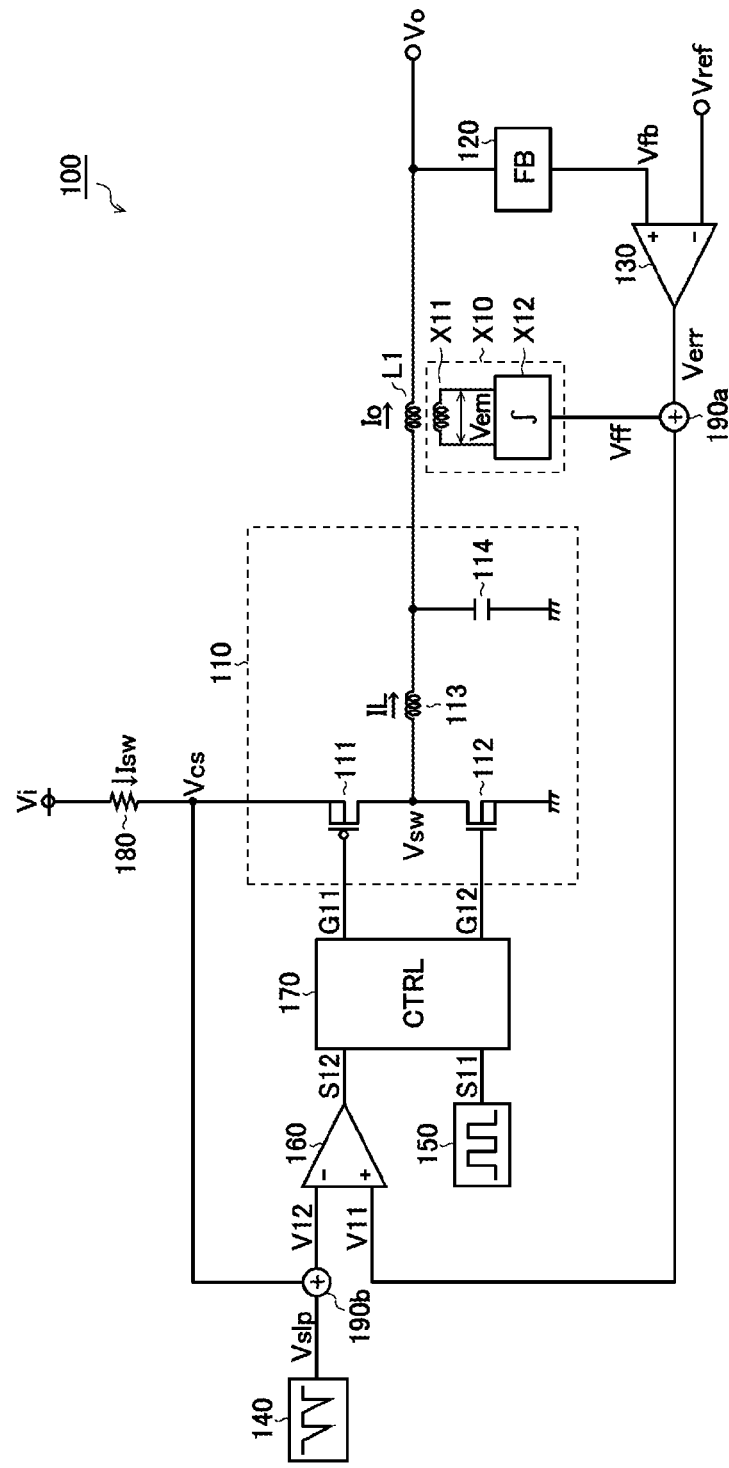
FIG. 1 is a block diagram showing a first embodiment of a power supply device.

FIG. 1 is a block diagram showing a first embodiment of a power supply device. The power supply device 100 according to the first embodiment has: an output portion 110; a feedback voltage generator 120; an error amplifier 130; a slope voltage generator 140; a clock signal generator 150; a PWM [pulse width modulation] comparator 160; a switching controller 170; a sense resistor 180; adders 190a and 190b; and a load change detector X10.

The output portion 110 is a voltage step-down switching output stage of synchronization rectification type that generates an output voltage Vo from an input voltage Vi and supplies the output voltage to a load (not shown), and includes: an output transistor 111; a synchronization rectification transistor 112; an inductor 113; and an output capacitor 114. In the meantime, in the example in the present figure, a PMOSFET [P-channel type metal oxide semiconductor field effect transistor] is used as the output transistor 111, and an NMOSFET [N-channel type MOSFET] is used as the synchronization rectification transistor 112.

A source and back gate of the output transistor 111 are all connected to an application terminal for the input voltage Vi via the sense resistor 180. A gate of the output transistor 111 is connected to an application terminal for a gate signal G11. A source and back gate of the synchronization rectification transistor 112 are all connected to a ground terminal. A gate of the synchronization rectification transistor 112 is connected to an application terminal for a gate signal G12. Respective drains of the output transistor 111 and synchronization rectification transistor 113 are all connected to a first terminal of the inductor 113. A second terminal of the inductor 113 and a first terminal of the output capacitor 114 are all connected to an application terminal for the output voltage Vo. A second terminal of the output capacitor 114 is connected to a ground terminal.

The output transistor 111 is turned off when the gate signal G11 is at a high level, and turned on when the gate signal G11 is at a low level. On the other hand, the synchronization rectification transistor 112 is turned on when the gate signal G12 is at a high level, and turned off when the gate signal G12 is at a low level. If the output transistor 111 and the synchronization rectification transistor 112 are turned on/off in a complementary manner, a rectangular waveform-shaped switch voltage Vsw is generated at the first terminal of the inductor 113. The inductor 13 and the output capacitor 114 function as an LC filter that smooths the switch voltage Vsw to generate the output voltage Vo.

The feedback voltage generator 120 generates a feedback voltage Vfb (e.g., a divided voltage of the output voltage Vo) in accordance with the output voltage Vo. In the meantime, in a case where the output voltage Vo is in an input dynamic range of the error amplifier 130, the output voltage Vo may be directly input into the error amplifier 130 without using the feedback voltage generator 120.

The error amplifier 130 generates an error voltage Verr in accordance with a difference between the feedback voltage Vfb input into a non-inverting input terminal (+) and a reference voltage Vref input into an inverting input terminal (−). The error voltage Verr rises when the feedback voltage Vfb is higher than the reference voltage Vref, and drops when the feedback voltage Vfb is lower than the reference voltage Vref.

The slope voltage generator 140 generates a triangular waveform-shaped, saw-tooth-shaped, or n-degree-slope-shaped (e.g., n=2) slope voltage Vslp having a predetermined switching frequency fsw.

The clock signal generator 150 generates a rectangular waveform-shaped clock signal S11 having the predetermined switching frequency fsw.

The PWM comparator 160 compares a first voltage V11 (=Verr+Vff) input into a non-inverting input terminal (+) and a second voltage V12 (=Vslp+Vcs) input into an inverting input terminal (−) with each other to generate a comparison signal S12. The comparison signal S12 goes to a high level when the first voltage V11 is higher than the second voltage V12, and goes to a low level when the first voltage V11 is lower than the second voltage V12.

The switching controller 170 generates the gate signals G11 and G12 in accordance with the clock signal S11 and comparison signal S12 and thereby turns on/off the output transistor 111 and the synchronization rectification transistor 112 in a complementary manner. For example, the switching controller 170 brings the gate signals G11 and G12 to the low level at a rising edge of the clock signal S11, and brings the gate signals G11 and G12 to the high level at a rising edge of the clock signal S12.

The sense resistor 180 (resistance value: Rcs) is connected between the application terminal for the input voltage Vi and the output transistor 111, and generates a sense voltage Vcs (=Isw×Rcs) from a switch current Isw that flows in the output transistor 111. Accordingly, the larger the switch current Isw is, the lower the sense voltage Vcs becomes, and the smaller the switch current Isw is, the higher the sense voltage Vcs becomes. In the meantime, the sense resistor 180 may be connected between the ground terminal and the synchronization rectification transistor 112. Besides, the sense voltage Vcs may be generated by detecting an inductor current IL that flows in the inductor 113.

The adder 190a adds the feed forward voltage Vff (which corresponds to a detection result from the load change detector X10) to the error voltage Verr to generate the first voltage V11.

The adder 190b adds the sense voltage Vcs to the slope voltage Vslp to generate the second voltage V12.

The above-described feedback voltage generator 120, error amplifier 130, slope voltage generator 140, clock signal generator 150, PWM comparator 160, switching controller 170, sense resistor 180, adders 190a and 190b form an output feedback controller that drives the output portion 110 by performing output feedback control in a current control mode. In the meantime, in a case where the current mode control is not employed but voltage mode control is employed as an output feedback method, the sense resistor 180 and the adder 190b are removed, and the slope voltage Vslp may be directly input into the inverting input terminal (−) of the PWM comparator 160.

The load change detector X10 is a circuit portion that detects a change in a monitoring target current (in the example in the present figure, an output current Io flowing in a post-stage of the output capacitor 114) due to a load change, and includes a magnetic coupling portion X11 and an integrator X12.

The magnetic coupling portion X11 is an electric conductor that has a predetermined inductance component, and magnetically connects to an inductance component L1 of an output line (which corresponds to a monitoring target current route) where the output current Io flows. In light of output characteristic improvement and noise characteristic improvement of the power supply device 100, it is desirable that the inductance component L1 is as small as possible. However, in the present structure which targets the output current Io for monitoring, if the inductance component L1 is too small, it becomes hard to detect a load change. Accordingly, it is necessary to suitably design the inductance component L1 in light of the above trade-off. In the meantime, variations of a magnetic coupling method are described later by means of specific examples.

The integrator X12 integrates an induced voltage Vem (or induced current Iem) occurring in the magnetic coupling portion X11 because of a change in the output current Io to generate the feed forward voltage Vff and outputs the feed forward voltage to the adder 190a. By employing such a structure, a detection result of a load change is reflected with no delay into the output feedback control; accordingly, it becomes possible to raise a load response. In the meantime, the feed forward operation using the load change detector X10 is described later in detail.

Figure 2:
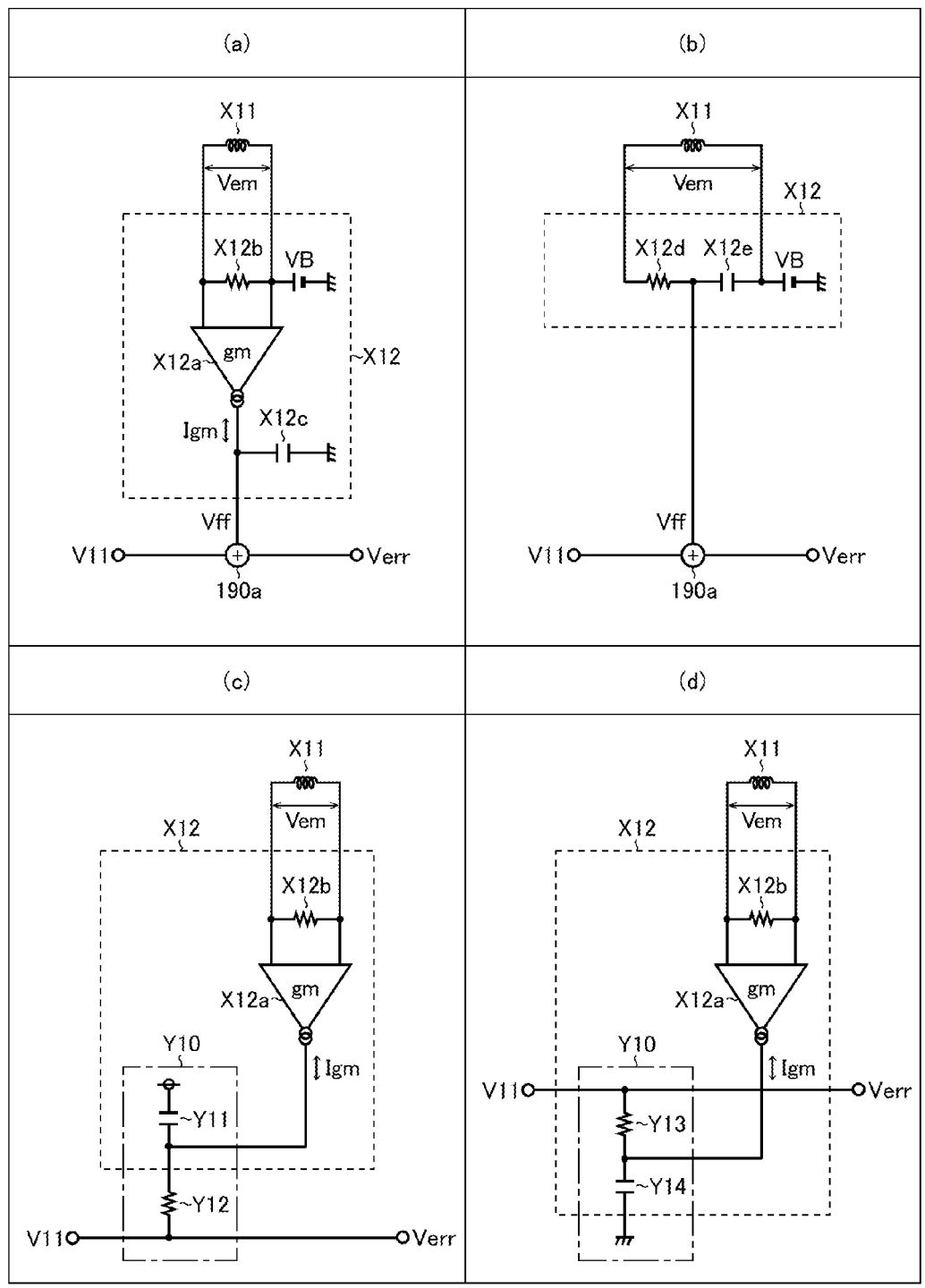
FIG. 2 is a table showing variations of an integrator X12.

FIG. 2 is a table showing variations of the integrator X12. The integrator X12 in an (a) box includes a current amplifier X12a, a resistor X12b, and a capacitor X12c. The current amplifier X12a generates an amplified current Igm in accordance with a voltage (the induced voltage Vem occurring in the magnetic coupling portion X11) across the resistor X12b. The higher the induced voltage Vem is, the larger the amplified current Igm becomes, and the lower the induced voltage Vem is, the smaller the amplified current Igm becomes. The resistor X12b is connected in parallel with the magnetic coupling portion X11. A bias voltage VB is applied to one terminal of the resistor X12b. The capacitor X12c is connected between an output terminal of the current amplifier X12a and a ground terminal, charged and discharged by the amplified current Igm. In the integrator X12 of the present structural example, a charge voltage of the capacitor X12c is output as the feed forward voltage Vff to the adder 190a. In the meantime, to curb an output off-set due to fluctuation of the amplified current Igm, it is desirable to use the current amplifier X12a having high accuracy and to dispose a correction circuit for the amplified current Igm. Besides, the resistor X12b is not an essential component and may be suitably removed.

The integrator X12 in a (b) box includes a resistor X12d and a capacitor X12e. A first terminal of the resistor X12d is connected to a first terminal of the magnetic coupling portion X11. A second terminal of the resistor X12d is connected to a first terminal of the capacitor X12e. A second terminal of the capacitor X12e is connected to a second terminal of the magnetic coupling portion X11. The bias voltage VB is applied to the second terminal of the capacitor X12e. In the integrator X12 of the present structural example, a node voltage, which appears at a connection node between the resistor X12d and the capacitor X12e, is output as the feed forward voltage Vff to the adder 190a.

The integrator V12 in a (c) box has the basically same structure as the (a) box, in which a phase compensation circuit Y10 connected to an output terminal of the error amplifier 130 is used to mount the integrator X12 and the adder 190a. The phase compensation circuit Y10 includes a phase compensation capacitor Y11 and a phase compensation resistor Y12 that are connected in series between a power supply terminal and the output terminal of the error amplifier 130 (an application terminal for the error voltage Verr). In the integrator X12 in the (c) box, the capacitor X12c in the (a) box is removed, and an output terminal of the current amplifier X12a is connected to a connection node between the phase compensation capacitor Y11 and the phase compensation resistor Y12. In other words, the phase compensation capacitor Y11 is used as the above capacitor X12c.

The integrator X12 in a (d) box has the basically same structure of the (c) box, and a phase compensation resistor Y13 and a phase compensation capacitor Y14, which form the phase compensation circuit Y10, are connected between the output terminal of the error amplifier 130 and a ground terminal. In the integrator X12 in the (d) box, the capacitor X12c in the (a) box is removed, and the output terminal of the current amplifier X12a is connected to a connection node between the phase compensation resistor Y13 and the phase compensation capacitor Y14. In other words, the phase compensation capacitor Y14 is used as the above capacitor X12c.

In all of the boxes (a) to (d) in the present figure, the structures are described as examples, in which the feed forward voltage Vff is added to the error voltage Verr; however, in the power supply device 100 under the current mode control, it is also possible to reflect an output from the load change detector X10 into a feedback loop of the inductor current IL. For example, it is conceivable that the feed forward voltage Vff is subtracted from the sense voltage Vcs.

Figure 3:
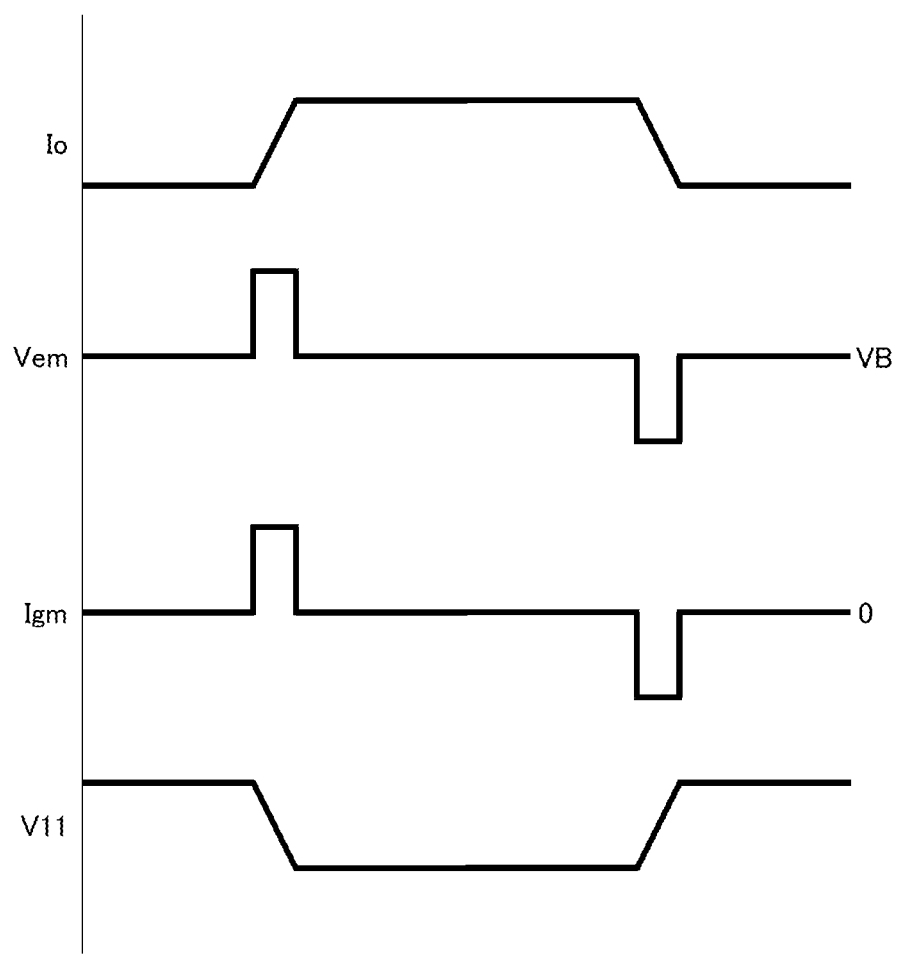
FIG. 3 is a waveform view showing an example of a feed forward operation.

FIG. 3 is a waveform view showing an example of the feed forward operation, and illustrates, from top in order, the output current Io, the induced voltage Vem, the amplified current Igm, and the first voltage V11 (=Verr+Vff). As shown in the present figure, if the output current Io sharply increases or decreases because of the load change, magnetic flux (magnetic field) generated by the output current Io changes, and the induced voltage Vem ($\propto$dIo/dt) proportional to a time-dependent change (differential amount) in the magnetic flux (magnetic field) occurs in the magnetic coupling portion X11.

The integrator X12 (e.g., see the FIG. 2(c) box) performs a charge/discharge (integration) of the phase compensation capacitor Y11 (capacitance value: C) by using the amplified current Iem derived from V/I conversion of the induced voltage Vem, thereby generating the first voltage V11 that is obtained by adding the feed forward voltage Vff (=(1/C)× ∫Igm dt) to the error voltage Verr.

The detection results (load change amount and load change speed) of the load change are directly fed forward to an output feedback loop by the above series of operations; accordingly, the first voltage V11 comes to change sharply in accordance with the load change.

Figure 4:
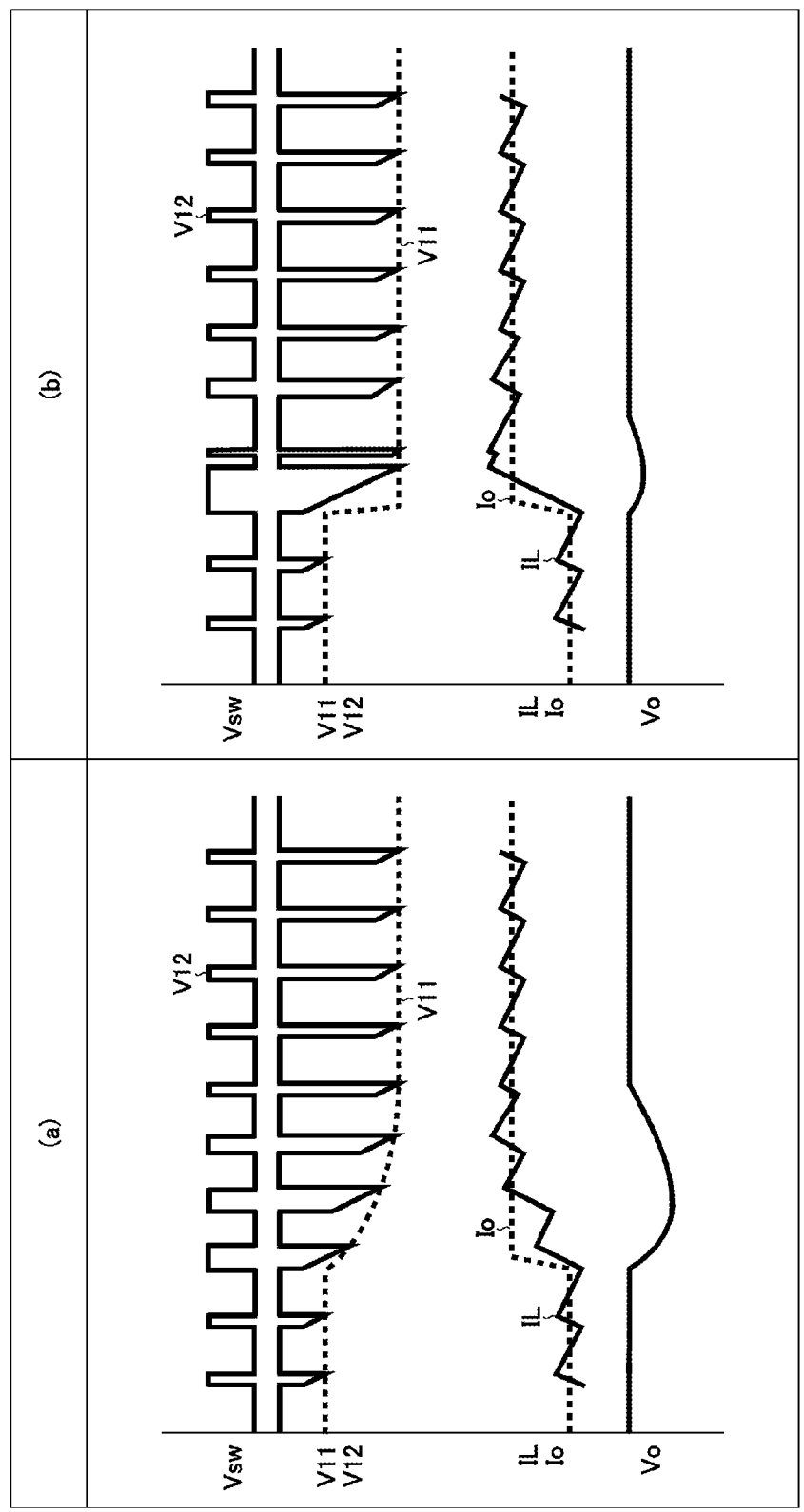
FIG. 4 is a table showing operation and effect of a feed forward operation.

FIG. 4 is a table showing operation and effect of the feed forward operation, in which each of an (a) box a (b) box illustrates behavior of, from top in order, the switch voltage Vsw, first voltage V11 (broken line) and second voltage V12 (solid line), inductor current (IL) (solid line) and output current Io (broken line), and output voltage Vo. In the meantime, the (a) box shows behavior of "without the feed forward operation," and the (b) box shows behavior of "with the feed forward operation."

In the "without the feed forward operation" of the (a) box, only a feedback operation passing through the error amplifier 130 is performed in a way of sharp increase in the output current Io→decrease in the output voltage Vo→decrease in the error voltage Verr (first voltage V11)→extension of the on-period. In such a feed forward operation, a phase delay due to the output capacitor 114 occurs; accordingly, the load response becomes low.

On the other hand, in the "with the feed forward operation" of the (b) box, in parallel with the feed feedback operation of the (a) box, the feed forward operation without passing through the error amplifier 130 is performed in a way of sharp increase in the output current Io→decrease in the first voltage V11→extension of the on-period.

According to such feed forward operation, it is possible to make the first voltage V11 change sharply without being influenced by the phase delay of the output capacitor 114. Therefore, it is possible to make the inductor current IL change with no delay following the change in the output current Io; accordingly, it becomes possible to raise the load response of the power supply device 100 and minimize the change amount of the output voltage Vo. In the meantime, if the change amount of the output voltage Vo equal to the change amount in the case of the "without the feed forward operation" is tolerated, it is possible to reduce the capacitance of the output capacitor 114.

Besides, the above feed forward operation has advantages of: (1) not influencing stability of the system because the feed forward operation becomes valid at the load change time only; (b) not being influenced by a cut-off frequency (critical inductance) of the system; (3) being relatively easy to use a high frequency because detection sensitivity rises if a gain (dIgm/dt) of the current amplifier X12a is increased; (4) quick response to the load change from a light load state; and (5) being able to perform a high SN ratio detection even at a high input-to-output voltage ratio.

Second Embodiment

Figure 5:
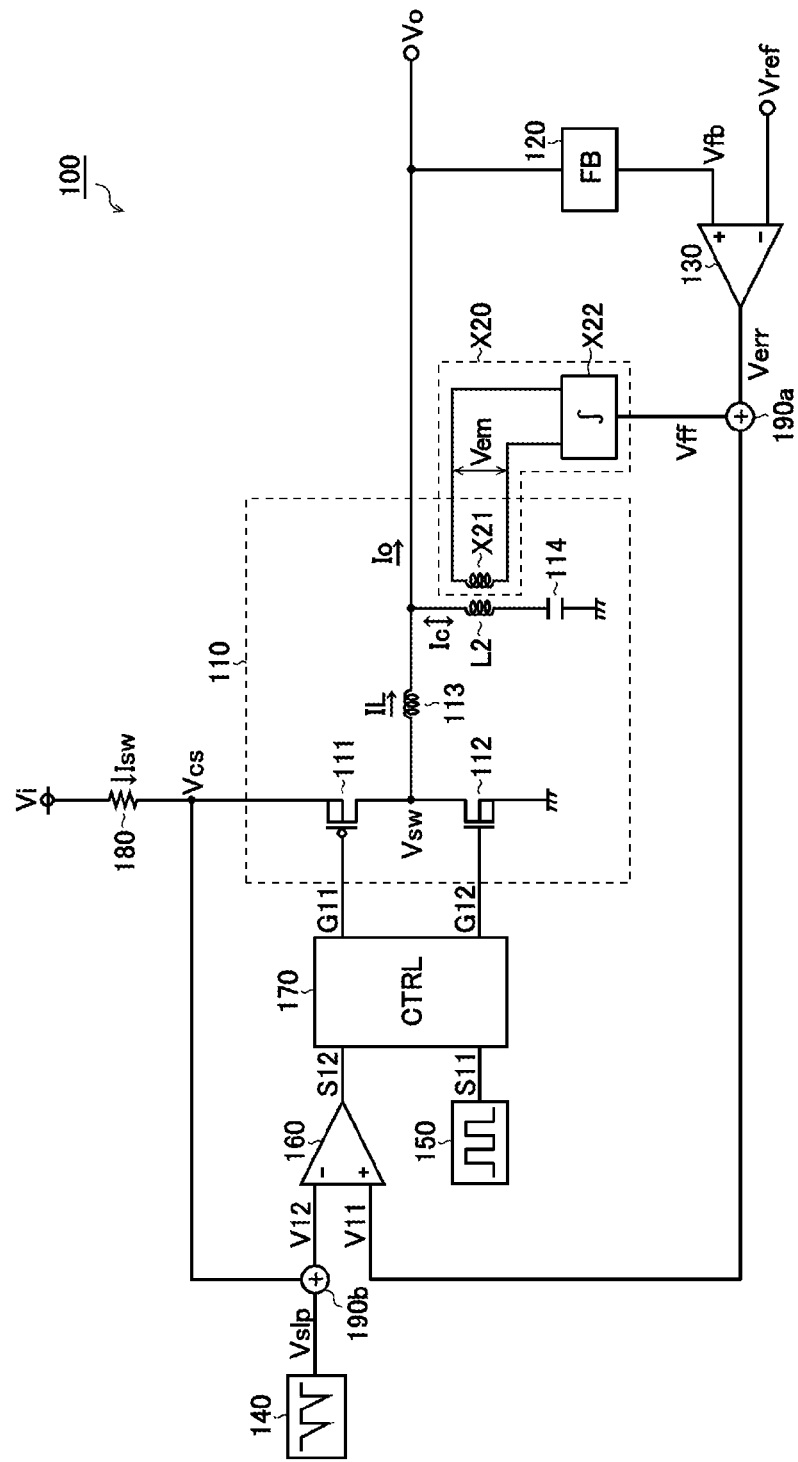
FIG. 5 is a block diagram showing a second embodiment of a power supply device.

FIG. 5 is a block diagram showing a second embodiment of the power supply device. The second embodiment is basically the same as the first embodiment, and characterized in including a load change detector X20 that targets a charge/discharge current Ic for monitoring which flows in and out of the output capacitor 114. Accordingly, the same components as the first embodiment are indicated by the same reference numbers to skip double description, and hereinafter, description is performed focusing on the load change detector X20 that is the characterizing portion of the second embodiment.

The load change detector X20 is a circuit portion that detects a change in the charge/discharge current Ic by means of the electromagnetic induction method, and includes a magnetic coupling portion X21 and an integrator X22.

The magnetic coupling portion X21 is an electric conductor that has a predetermined inductance component, and magnetically couples with an equivalent series inductance component L2 of the output capacitor 114, for example.

The integrator X22 integrates the induced voltage Vem (or the induced current Iem), which occurs in the magnetic coupling portion X21 because of a change in the charge/discharge current Ic, to generate the feed forward voltage Vff and outputs the feed forward voltage to the adder 190a. In the meantime, variations of the integrator X22 are the same as the description relevant to FIG. 2.

As described above, even by employing the structure that targets the charge/discharge current Ic of the output capacitor 114 for monitoring, it is possible to enjoy all the advantages of the above-described feed forward operation.

Besides, according to the second embodiment that targets the charge/discharge current Ic of the output capacitor 114 for monitoring, unlike the first embodiment that targets the output current Io for monitoring, the above-described trade-off is obviated. Accordingly, it becomes possible to curb the inductance component L1 of the output line as small as possible and improve the output characteristics and the noise characteristics of the power supply device 100.

Figure 6:
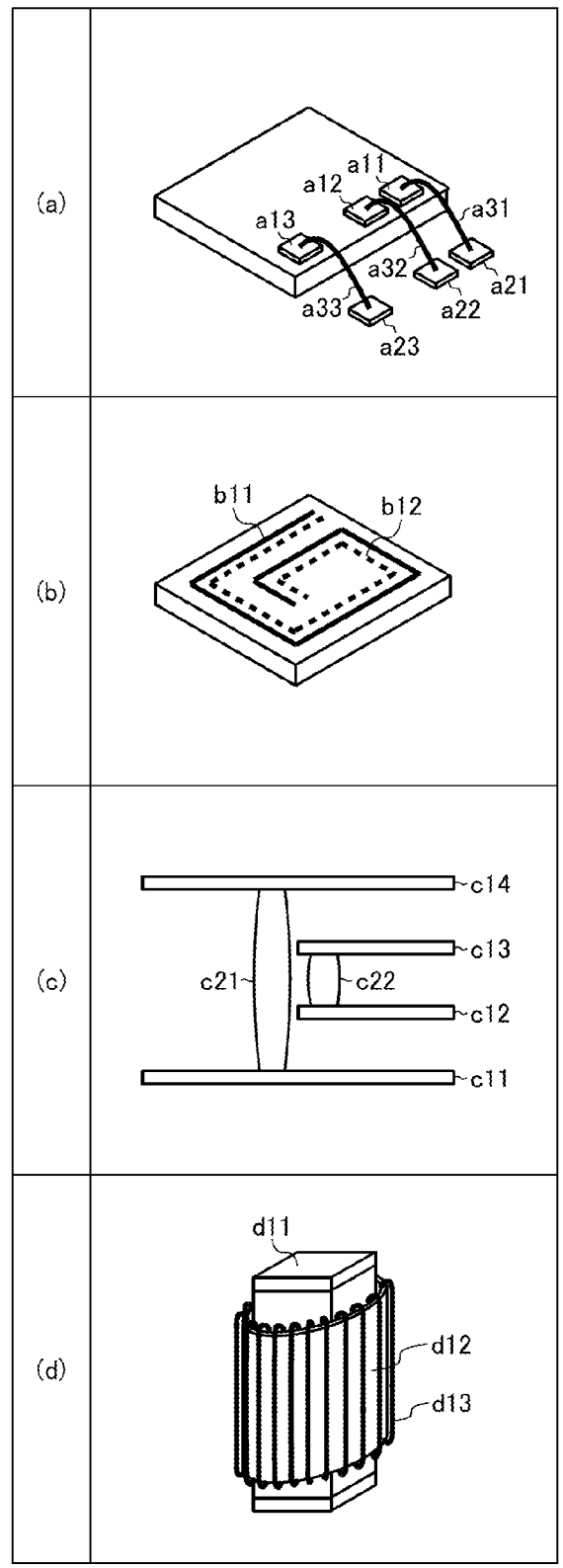
FIG. 6 is a table showing variations of a magnetic coupling method.

FIG. 6 is a table showing variations of the magnetic coupling method using the magnetic coupling portions X11 and X21. In an (a) box, a structural example is shown, in which magnetic coupling is performed between bonding wires adjacent to each other. In the example in the present figure, a bonding wire a31 connecting a pad a11 and a frame a21 to each other corresponds to the monitoring target current route, and a bonding wire a32 connecting a pad a12 and a frame a22 to each other corresponds to the magnetic coupling portion. In this case, it is desirable that the bonding wire a32 is as close to the bonding wire a31 as possible that is a target for magnetic coupling and is as far from a bonding wire a33 as possible that is not a target for magnetic coupling.

In a (b) box, a structural example is shown, in which magnetic coupling is performed between metal wirings adjacent to each other. For example, a metal wiring b11 corresponds to the monitoring target current route, and a metal wiring b12 corresponds to the magnetic coupling portion. In the meantime, in the example in the present figure, the metal wirings b11 and b12 parallel to each other are disposed on the same wiring layer; however, metal wirings stacked in a vertical direction may be laminated on different wiring layers. Besides, not metal wirings formed on a chip but metal wirings formed on a printed circuit board may be used.

In a (c) box, a diagrammatic longitudinal cross-sectional view of a chip is illustrated, where a structural example is shown, in which magnetic coupling is performed between vias adjacent to each other. For example, a via c21, which electrically connects a first wiring layer c11 and a fourth wiring layer c14 to each other, corresponds to the monitoring target current route, and a via c22, which electrically connects a second wiring layer c12 and a third wiring layer c13 to each other, corresponds to the magnetic coupling portion. In the meantime, in a case where there are a plurality of pairs of the via c21 and the via c22, by connecting the plurality of pairs of the vias c22 in series with each other, it becomes possible to raise a level of detecting the load change.

In a (d) box, a structural example is shown, in which magnetic coupling is performed by winding an electro-conductive cable around a chip capacitor (which corresponds to the output capacitor 114). In the example in the present figure, a chip capacitor d11 corresponds to the monitoring target current route, and an electro-conductive cable d13 corresponds to the magnetic coupling portion. According to such a structure, when detecting a current change, it becomes possible to use an equivalent series inductance component of the chip capacitor d11. Besides, in the example in the present figure, a magnetic material d12 is wound around the chip capacitor d11, and the electro-conductive cable d13 is wound around the magnetic material d12 used as a wound core. By employing such a structure, it becomes possible to raise sensitivity of detecting the load change by amplifying magnetic flux. In the meantime, the electro-conductive cable d31 may be wound around an air core without using the electro-conductive cable d13.

As described above, the magnetic coupling portions X11 and X12 can magnetically couple with any place where there is an inductance component.

Figure 7:
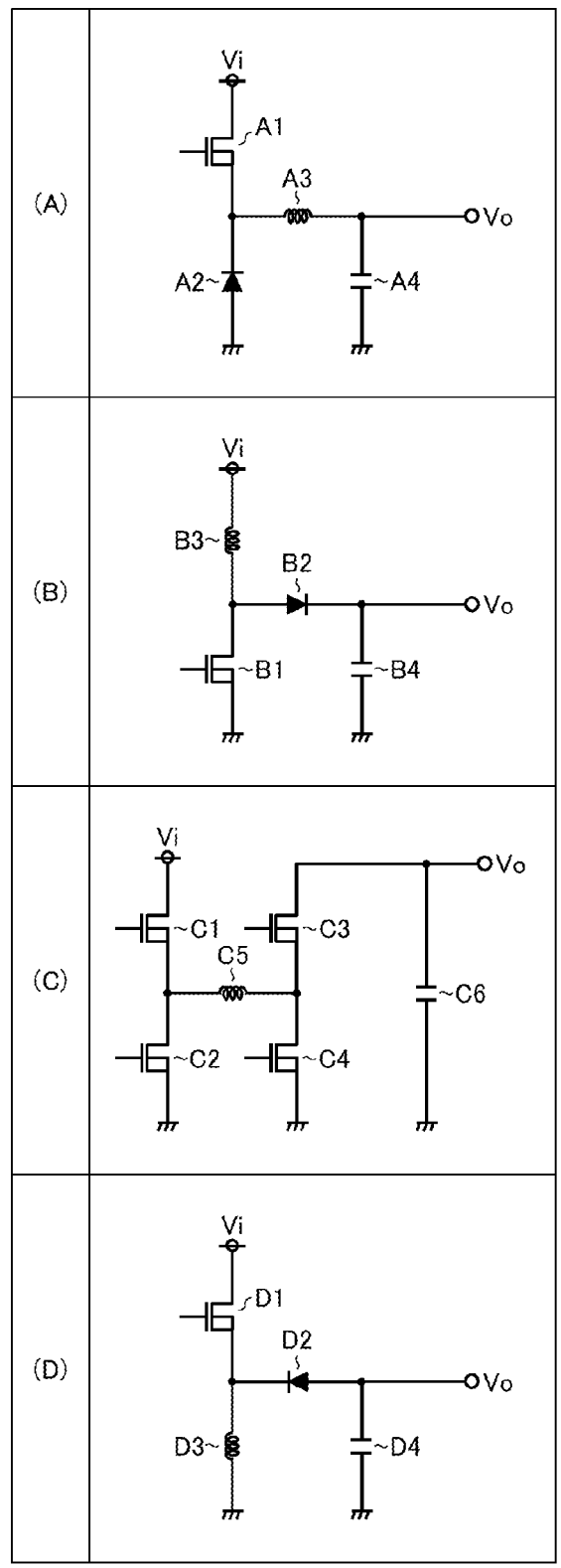
FIG. 7 is a table showing variations of an output portion 110.

FIG. 7 is a table showing variations of the output portion 110. In an (A) box, a voltage step-down switching output stage of diode rectification type is shown as an example. In the meantime, in the example in the present figure, an NMOSFET is used as an output transistor A1; however, like in FIG. 1 and FIG. 5, it is also possible to use a PMOSFET. Besides, in the example in the present figure, a rectification diode A2 is used as a rectification element; however, like in FIG. 1 and FIG. 5, it is also possible to use a synchronization rectification transistor.

In a (B) box, a voltage step-up switching output stage of diode rectification type is shown as an example. In the meantime, a synchronization rectification transistor may be used instead of the rectification diode A2.

In a (C) box, a voltage step-up/down switching output stage of synchronization rectification type is shown as an example. In the meantime, a rectification transistor may be used instead of synchronization rectification transistors C2 and C3.

In a (D) box, an inverting (negative output type) switching output stage of diode rectification type is shown as an example. In the meantime, a synchronization rectification transistor may be used instead of a rectification diode D2.

As shown in the (A) to (D) boxes in the present figure in which variation examples are described, as to the output type and rectification type of the output portion 110, any type may be used.

Third Embodiment

Figure 8:
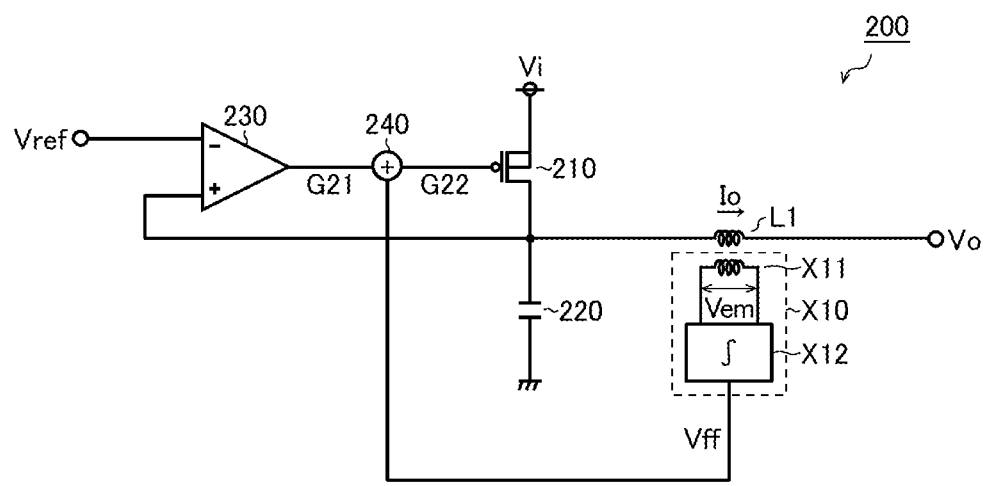
FIG. 8 is a block diagram showing a third embodiment of a power supply device.

FIG. 8 is a block diagram showing a third embodiment of the power supply device. A power supply device 200 according to the third embodiment has: an output transistor 210 (PMOSFET in the example in the present figure); an output capacitor 220; an operational amplifier 230; an adder 240; and the load change detector X10.

A source and back gate of the output transistor 210 are all connected to the application terminal for the input voltage Vi. A gate of the output transistor 210 is connected to an application terminal for the gate signal G22. A drain of the output transistor 210 and a first terminal of the output capacitor 220 are connected to the application terminal for the output voltage Vo. A second terminal of the output capacitor 220 is connected to a ground terminal.

As described above, an output portion of the power supply device 300 has a series-output configuration that generates the output voltage Vo from the input voltage Vi by controlling an electric conduction degree of the output transistor 210 that is connected between the application terminal for the input voltage Vi and the application terminal for the output voltage Vo.

The operational amplifier 230 generates the control signal G21 for the output transistor 210 such that the output voltage input into a non-inverting input terminal (+) and the predetermined reference voltage Vref input into an inverting input terminal (−) perform an imaginary short to each other. In the meantime, in a case where the output voltage Vo is not in an input dynamic range of the operational amplifier 230, the feedback voltage Vfb (e.g., a divided voltage of the output voltage Vo) in accordance with the output voltage Vo may be input into the operational amplifier 230.

The adder 240 adds the feed forward voltage Vff generated by the load change detector X10 to the control signal G21 to generate the gate signal G22.

The load change detector X10 is a circuit portion that detects, by means of the electromagnetic induction method, a change in a monitoring target current (in the example in the present figure, the output current Io flowing in a post-stage of the output capacitor 220) due to the load change to generate the feed forward voltage Vff. In the meantime, the structure and operation of the load change detector X10 are the same as the above description; accordingly, double description is skipped.

As described above, the load change detector X10 is applicable not only to a switching regulator but also to a series regulator (LDO regulator and the like).

Fourth Embodiment

Figure 9:
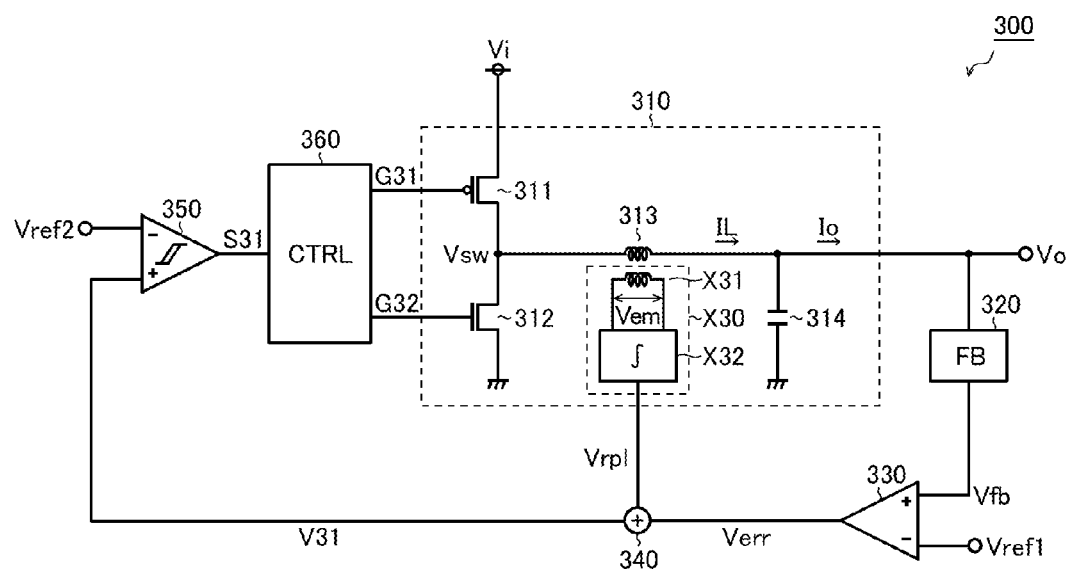
FIG. 9 is a block diagram showing a fourth embodiment of a power supply device.

FIG. 9 is a block diagram showing a fourth embodiment of the power supply device. A power supply device 300 according to the fourth embodiment has: an output portion 310; a feedback voltage generator 320; an error amplifier 330; an adder 340; a hysteresis comparator 350; a switching controller 360; and a ripple detector X30.

The output portion 310 is a voltage step-down switching output stage of the synchronization rectification type that generates the desired output voltage Vo from the input voltage Vi and supplies the output voltage to the load (not shown), and includes an output transistor 311, a synchronization rectification transistor 312, an inductor 313, and an output capacitor 314. In the meantime, a connection relationship and operation of each element are basically the same as the first embodiment (FIG. 1) and the second embodiment (FIG. 5), and the reference numbers on the order of 100 may be replaced with reference numbers on the order of 300 and double description is skipped. Besides, also variations of the output portion 310 are the same as the description of FIG. 7.

The feedback voltage generator 320 generates the feedback voltage Vfb (e.g., a divided voltage of the output voltage Vo) in accordance with the output voltage Vo. In the meantime, in a case where the output voltage Vo is in an input dynamic range of the error amplifier 330, the output voltage Vo may be directly input into the error amplifier 330 without using the feedback voltage generator 320.

The error amplifier 330 generates the error voltage Verr in accordance with a difference between the feedback voltage Vfb input into a non-inverting input terminal (+) and a reference voltage Vref1 input into an inverting input terminal (−). The error voltage Verr rises when the feedback voltage Vfb is higher than the reference voltage Vref1, and drops when the feedback voltage Vfb is lower than the reference voltage Vref1.

The adder 340 adds a ripple voltage Vrp1 (which corresponds to a detection result from the ripple detector X30) to the error voltage Verr to generate a first voltage V31 (an error voltage on which a ripple component is superposed).

The hysteresis comparator 350 compares the first voltage V31 (=Verr+Vrp1) input into a non-inverting input terminal (+) and a reference voltage Vref2 input into an inverting input terminal (−) with each other to generate a comparison signal S31. The comparison signal S31 goes to a high level when the first voltage V31 is higher than an upper-side threshold value (=Vref2), and goes to a low level when the first voltage V31 is low by a lower-side threshold value (=Vref2−Vhys). In the meantime, the reference voltage Vref1 and the reference voltage Vref2 may have the same voltage value or may have voltage values different from each other. Besides, it is possible to arbitrarily change the switching frequency fsw by suitably adjusting the hysteresis voltage Vhys.

The switching controller 360 generates gate signals G31 and G32 in accordance with the comparison signal S31 and thereby turns on/off the output transistor 311 and the synchronization rectification transistor 312 in a complementary manner. For example, the switching controller 360 generates the gate signals G31 and G32 such that the gate signals G31 and G32 are at low level during the low level period of the comparison signal S31, and at high level during the high level period of the comparison signal S31.

The above-described feedback voltage generator 320, error amplifier 330, adder 340, hysteresis comparator 350, and switching controller 360 form the output feedback controller that performs the output feedback control (current hysteresis control) such that the output voltage Vo becomes equal to a target value.

The ripple detector X30 is a circuit portion that detects a ripple component of a monitoring target current (in the example in the present figure, the inductor current IL flowing in the inductor 313 on a pre-stage of the output capacitor 314) due to on/off control of the output transistor 311 and synchronization rectification transistor 312, and includes a magnetic coupling portion X31 and an integrator X32.

The magnetic coupling portion X31 is an electric conductor that has a predetermined inductance component, and magnetically couples with the inductor 313 (which corresponds to the monitoring target current route) in which the inductor current IL flows. In the meantime, variations of the magnetic coupling method are described later in detail by using examples.

The integrator X32 integrates the induced voltage Vem (or induced current Iem) occurring in the magnetic coupling portion X31 because of a change in the inductor current IL to generate the ripple voltage Vrp1 and outputs the ripple voltage to the adder 340. By employing such a structure, in the power supply device 300, the output feedback control (current hysteresis control) is performed by using the ripple voltage Vrp1. In the meantime, variations of the integrator X32 are the same as the description of FIG. 2.

Figure 10:
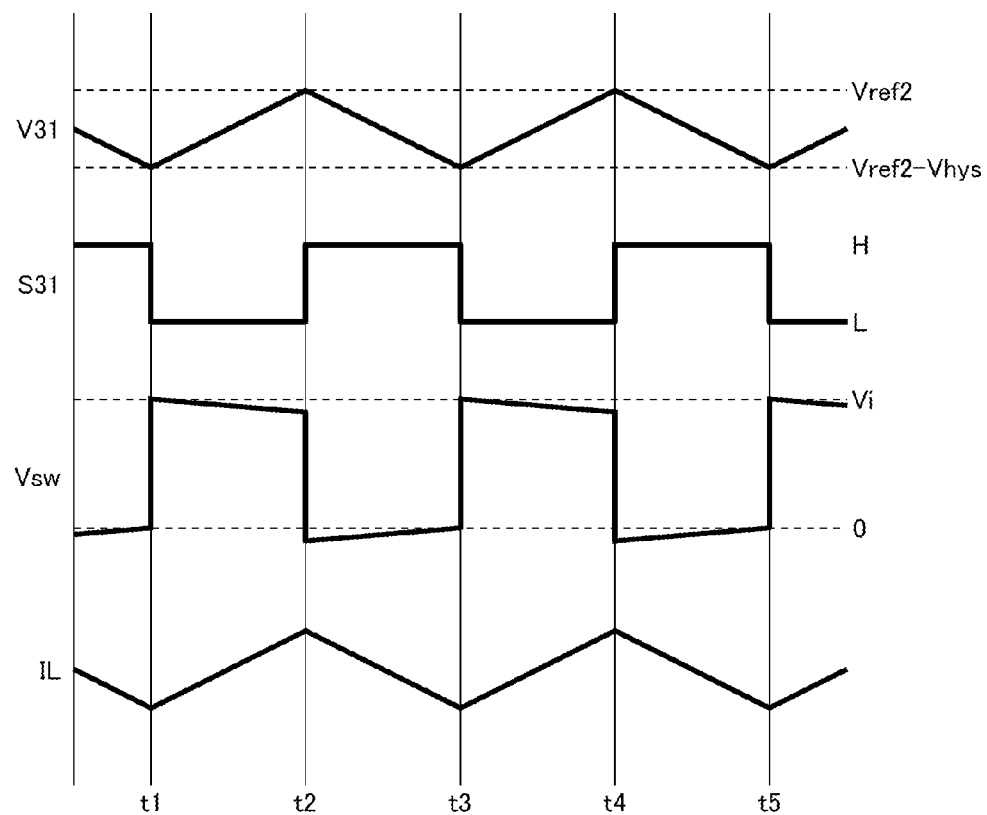
FIG. 10 is a timing chart showing an example of a current hysteresis control operation.

FIG. 10 is a timing chart showing an example of a current hysteresis control operation, and illustrates, from top in order, the first voltage V31 (=Verr+Vrp1), the comparison signal S31, the switch voltage Vsw, and the inductor current IL.

At a time point t1, if the first voltage V31 becomes lower than the lower-side threshold value (Vref2−Vhys), the comparison signal S31 falls from the high level to the low level. At this time, the output transistor 311 is turned on and the synchronization rectification transistor 312 is turned off; accordingly, the switch voltage Vsw rises nearly to the input voltage Vi. As a result of this, the inductor current IL switches to increase, and the first voltage V31 starts to rise.

At a time point t2, if the first voltage V31 becomes higher than the upper-side threshold value (Vref2), the comparison signal S31 rises from the low level to the high level. At this time, the output transistor 311 is turned off and the synchronization rectification transistor 312 is turned on; accordingly, the switch voltage Vsw drops nearly to a ground voltage GND. As a result of this, the inductor current IL switches to decrease, and the first voltage V31 starts to drop.

Even after a time point t3, the above series of operations are repeated, whereby the desired output voltage Vo is generated from the input voltage Vi.

As describe above, according to the structure that detects the ripple component of the inductor current IL and uses the detection result to perform the output feedback control (current hysteresis control), there are advantages: (1) an unnecessary power loss is not incurred unlike a method which inserts a sense resistor; (2) accuracy of detecting the inductor current IL improves compared with a method which uses an on-resistance (about a few milliohms) of a power transistor; (3) because of being unlikely to be influenced by a switching noise, it becomes possible to raise the switching frequency and pull down the minimum duty. Besides, the current hysteresis control is a kind of the current mode control, and has a high load response compared with the voltage mode control; accordingly, it is also possible to curb an output change at a time of load sharp change.

Figure 11:
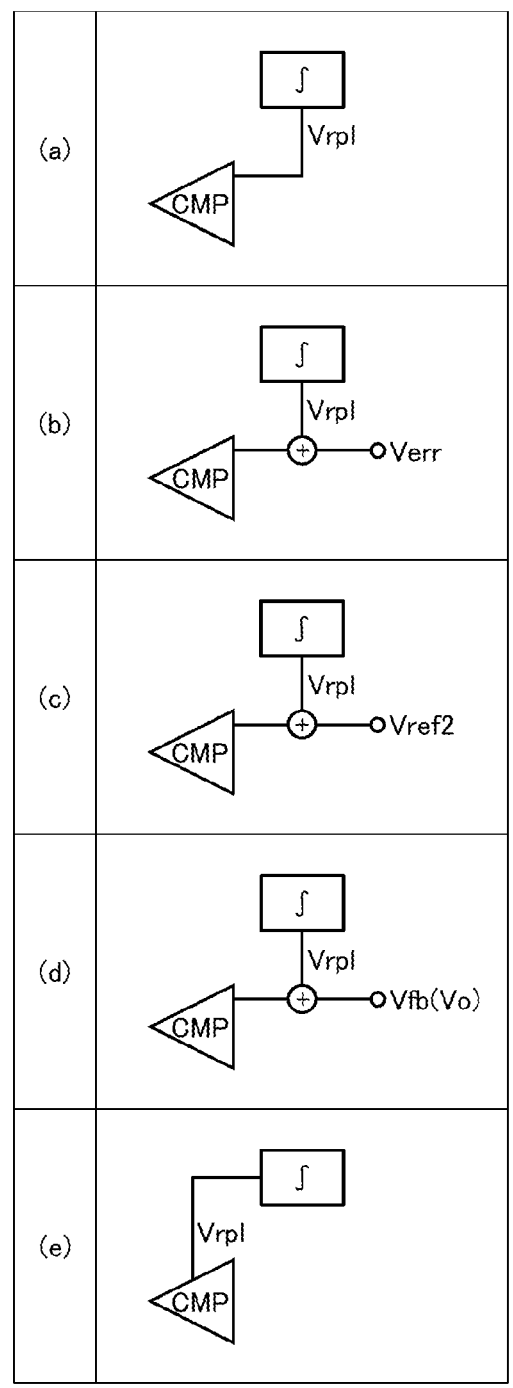
FIG. 11 is a table showing variations of a ripple feedback method.

FIG. 11 is a table showing variations of a ripple feedback method. As shown in an (a) box, the ripple voltage Vrp1 may be directly input into a comparator. Besides, as shown in a (b) box, the ripple voltage Vrp1 may be added to the error voltage Verr, and then input into the comparator. Besides, as shown in a (c) box, the ripple voltage Vrp1 may be added to the reference voltage Vref2, and then input into the comparator. Besides, as shown in a (d) box, the ripple voltage Vrp1 may be added to the output voltage Vo or to the feedback voltage Vfb in accordance with the output voltage, and then input into the comparator. In this case, the error amplifier 330 becomes unnecessary. Besides, as shown in an (e) box, the comparator may be structured to have an input off-set in accordance with the ripple voltage Vrp1.

In the meantime, in a case where another non-linear control method (on-time fixing method or off-time fixing method) using the ripple voltage Vrp1 is employed instead of the current hysteresis control method, a comparator having no hysteresis may be used.

Figure 12:
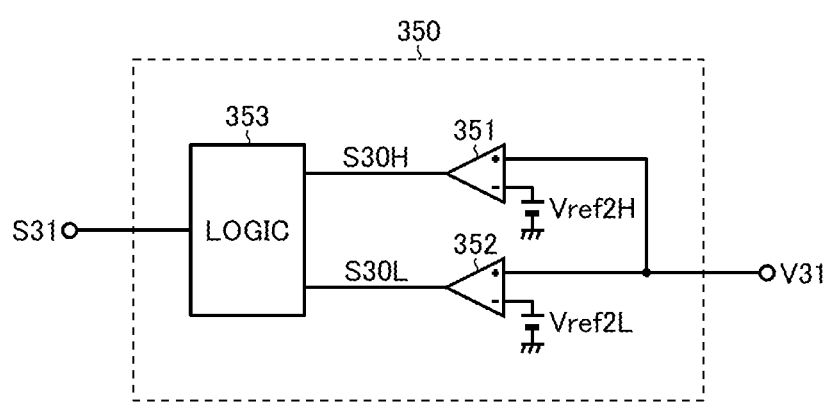
FIG. 12 is a block diagram showing a variation of a hysteresis comparator 350.

FIG. 12 is a block diagram showing a variation of the hysteresis comparator 350. The hysteresis comparator 350 of the present structural example includes a first comparator 351, a second comparator 352, and a logical operation unit 353.

The first comparator 351 compares the first voltage V31 input into a non-inverting input terminal (+) and an upper-side threshold value voltage Vref2H input into an inverting input terminal (−) with each other to generate a first comparison signal S30H. The first comparison signal S30H goes to a high level when the first voltage V31 is higher than the upper-side threshold value voltage Vref2H, and goes to a low level when the first voltage V31 is lower than the upper-side threshold value voltage Vref2H.

The second comparator 352 compares the first voltage V31 input into a non-inverting input terminal (+) and a lower-side threshold value voltage Vref2L (<Vref2H) input into an inverting input terminal (−) with each other to generate a second comparison signal S30L. The second comparison signal S30L goes to a high level when the first voltage V31 is higher than the lower-side threshold value voltage Vref2L, and goes to a low level when the first voltage V31 is lower than the lower-side threshold value voltage Vref2L.

The logical operation unit 353 generates a comparison signal S31 from the first comparison signal S30H and the second comparison signal S30L. The comparison signal S31 is set to a high level at a rising edge of the first comparison signal S30H, and reset to a low level at a falling edge of the second comparison signal S30L.

As described above, the hysteresis comparator 350 is not always a single comparator, but may be formed of two comparators that have threshold values different from each other.

Figure 13:
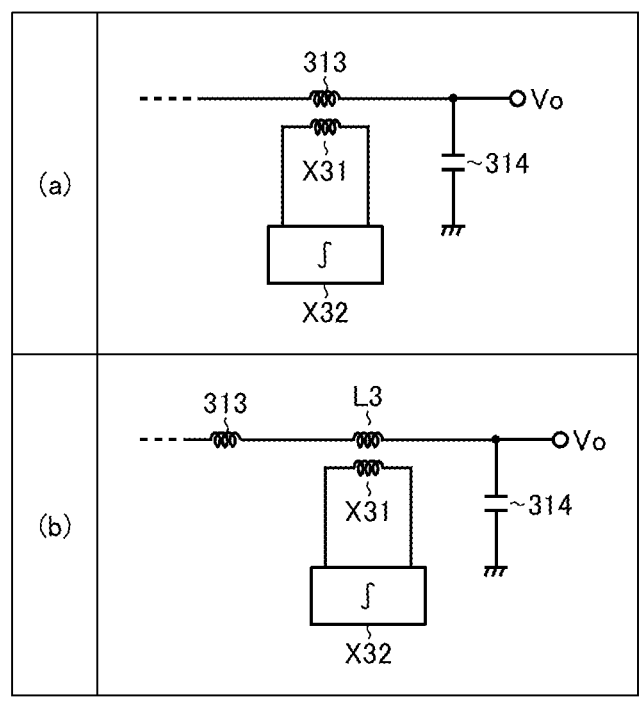
FIG. 13 is a table showing variations of a magnetic coupling position.

FIG. 13 is a table showing variations of the magnetic coupling position of the magnetic coupling portion X31. In an (a) box, like in FIG. 9, the magnetic coupling portion X31 is coupled to the inductor 313 that forms a portion of the LC filter. On the other hand, in a (b) box, the magnetic coupling portion X31 is coupled to an inductance component L3 of a current line in which the inductor current IL flows in a pre-stage of the output capacitor 314.

Figure 14:
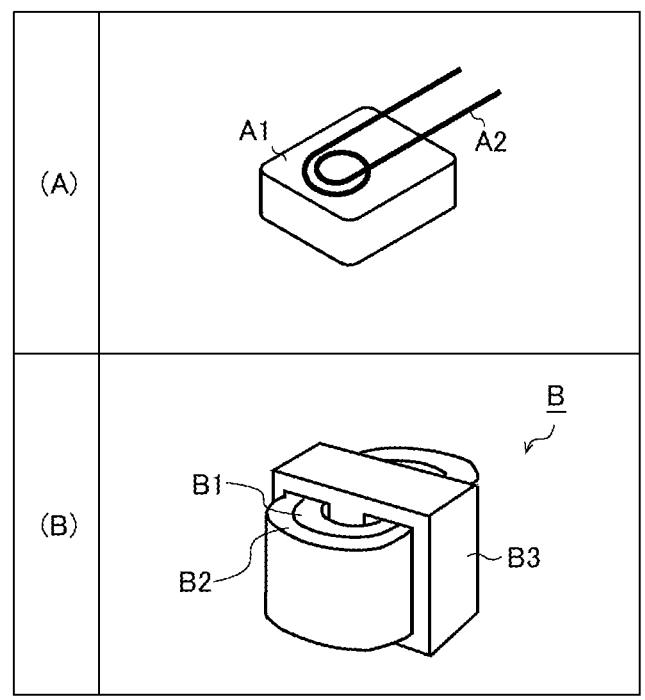
FIG. 14 is a table showing variations of a magnetic coupling method.

FIG. 14 is a table showing variations of the magnetic coupling method applied to the inductor 313. In an (A) box, a structural example is shown, in which an electro-conductive cable A2 is wound around a chip inductor A1 (which corresponds to the inductor 313) to perform magnetic coupling. In the example in the present figure, the chip inductor A1 corresponds to the monitoring target current route, and the electro-conductive cable A2 corresponds to the magnetic coupling portion.

In a (B) box, a structural example is shown, in which a transformer B is used to perform magnetic coupling. In the example in the present figure, a primary winding B1 corresponds to the monitoring target current route (inductor 313), and a secondary winding B2 corresponds to the magnetic coupling portion. In the meantime, the primary winding B1 and the secondary winding B2 are magnetically coupled to each other via a core B3.

As described above, the magnetic coupling portion X31 can be magnetically coupled to any place where there is an inductance component.

In the meantime, as shown in FIG. 13(b) box, in the case where the magnetic coupling portion X31 is coupled to the inductance component L3 of the current line, it is possible to employ the magnetic coupling methods shown in FIG. 6(a) to (c) boxes.

Fifth Embodiment

Figure 15:
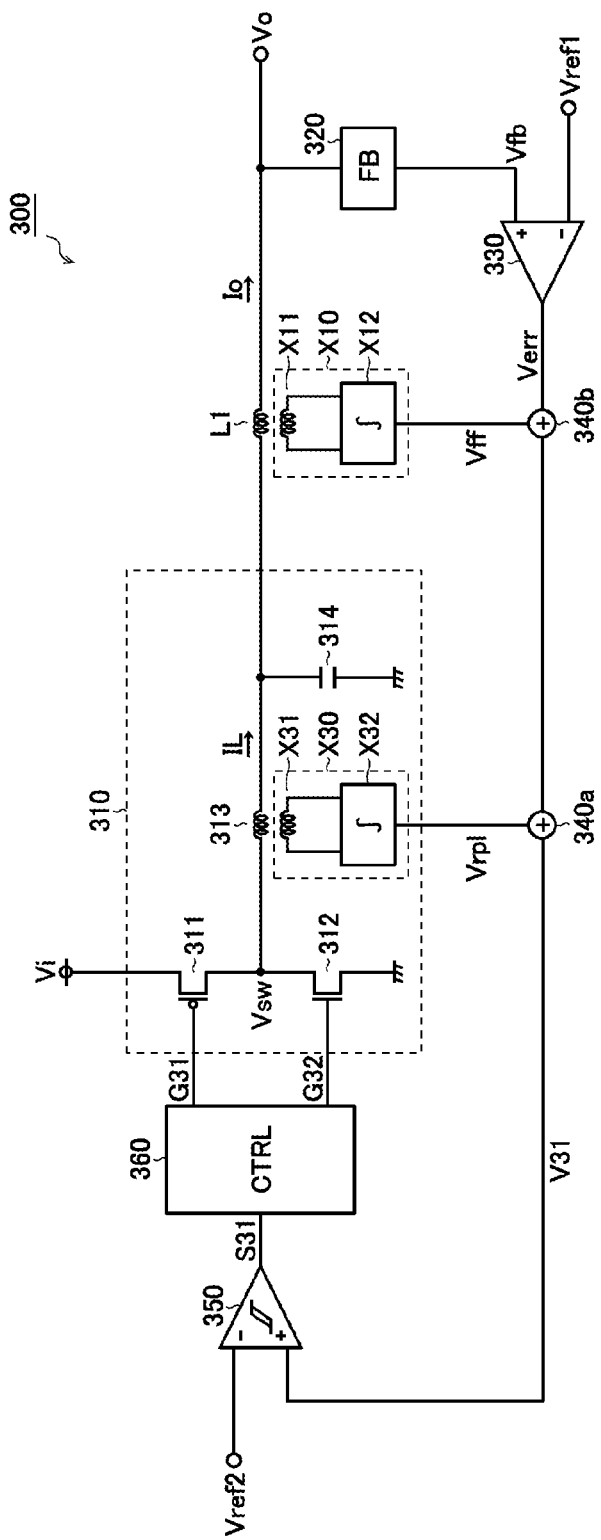
FIG. 15 is a block diagram showing a fifth embodiment of a power supply device.

FIG. 15 is a block diagram showing a fifth embodiment of the power supply device. The power supply device 300 according to the fifth embodiment builds on the fourth embodiment (FIG. 9), and is characterized in that the load change detector X10 of the first embodiment (FIG. 1) is added.

The ripple voltage Vrp1 generated by the ripple detector X30 is added to the error voltage Verr by an adder 340a. On the other hand, the feed forward voltage Vff generated by the load change detector X10 is added to the error voltage Verr by an adder 340b. As a result of this, the first voltage V31 input into the hysteresis comparator 350 becomes a voltage value (=Verr+Vrp1+Vff) that is obtained by adding both ripple voltage Vrp1 and feed forward voltage Vff to the error voltage Verr.

As described above, by detecting the change component of the output current Io and the ripple component of the inductor current IL by means of the electromagnetic induction method and combining the feed forward operation and the current hysteresis control, it becomes possible to further raise the load response of the power supply device 300.

Sixth Embodiment

Figure 16:
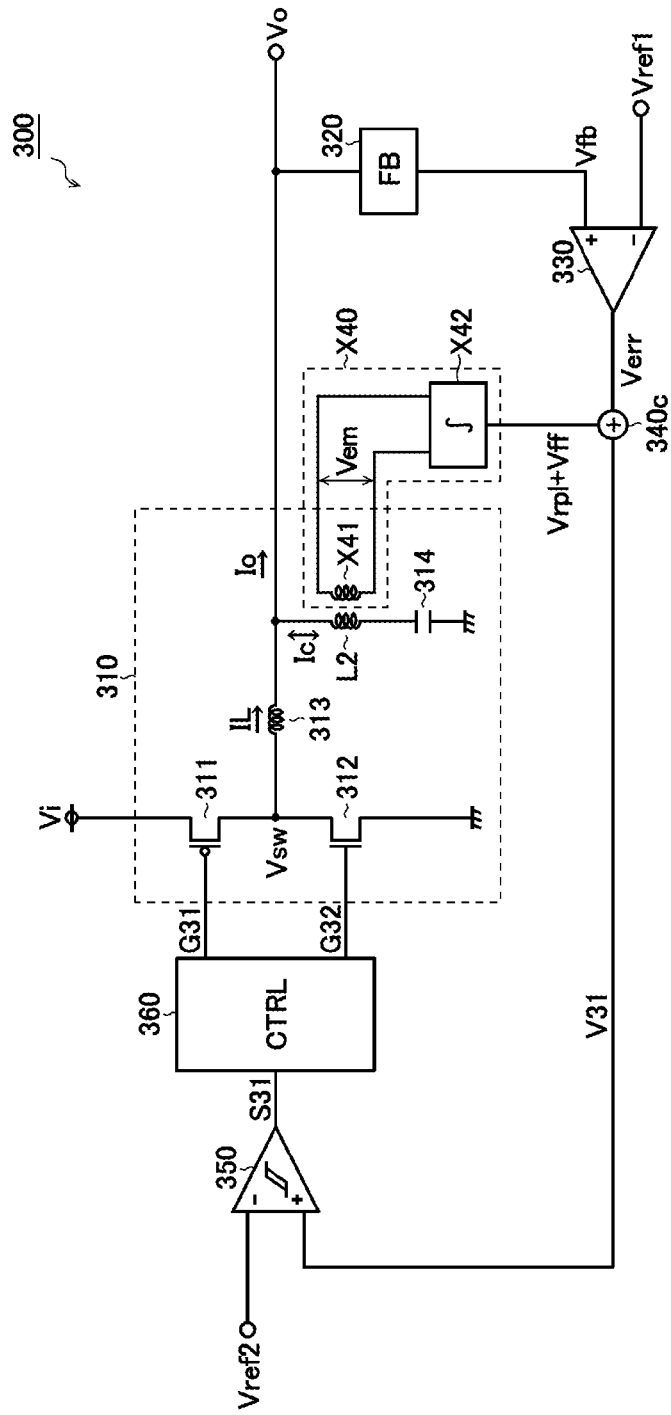
FIG. 16 is a block diagram showing a sixth embodiment of a power supply device.

FIG. 16 is a block diagram showing a sixth embodiment of the power supply device. The power supply device 300 according to the sixth embodiment is basically the same as the fifth embodiment (FIG. 15), and is characterized in including a detector X40 that targets the charge/discharge current Ic flowing in and out of the output capacitor 314 instead of both load change detector X10 and ripple detector X30.

An output (=Vrp1+Vff) from the detector X40 is added to the error voltage Verr by an adder 340c. Accordingly, the first voltage V31 input into the hysteresis comparator 350 becomes the voltage value (=Verr+Vrp1+Vff) that is obtained by adding both ripple voltage Vrp1 and feed forward voltage Vff to the error voltage Verr.

As described above, by not-targeting separately the inductor current IL and the output current Io for monitoring but by targeting the charge/discharge current Ic including both components for monitoring, it becomes possible to reduce the circuit scale by unifying the detector X40.

In the meantime, in a case where a magnetic coupling portion X41 is coupled to the equivalent series inductance component L2 of the output capacitor 314, it is possible to employ the magnetic coupling method shown in FIG. 6(d) box.

Seventh Embodiment

Figure 17:
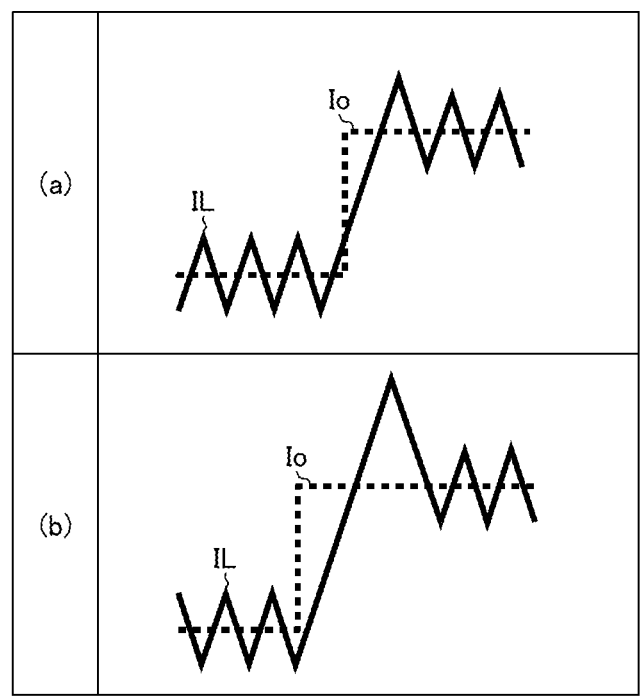
FIG. 17 is a table showing a best case and a worst case.

FIG. 17 is a table showing the best case and worst case at the load change time. In an (a) box, the best case is shown, in which the output current Io sharply increases at a timing when the inductor current IL becomes the largest. On the other hand, in a (b) box, the worst case is shown, in which the output current sharply increases at a timing when the inductor current IL becomes the smallest. In the worst case, an overshoot of the inductor current IL occurs, and settling of the inductor current IL requires a long time. Because of this, a structure for reducing difference between the best case and the worst case is proposed.

Figure 18:
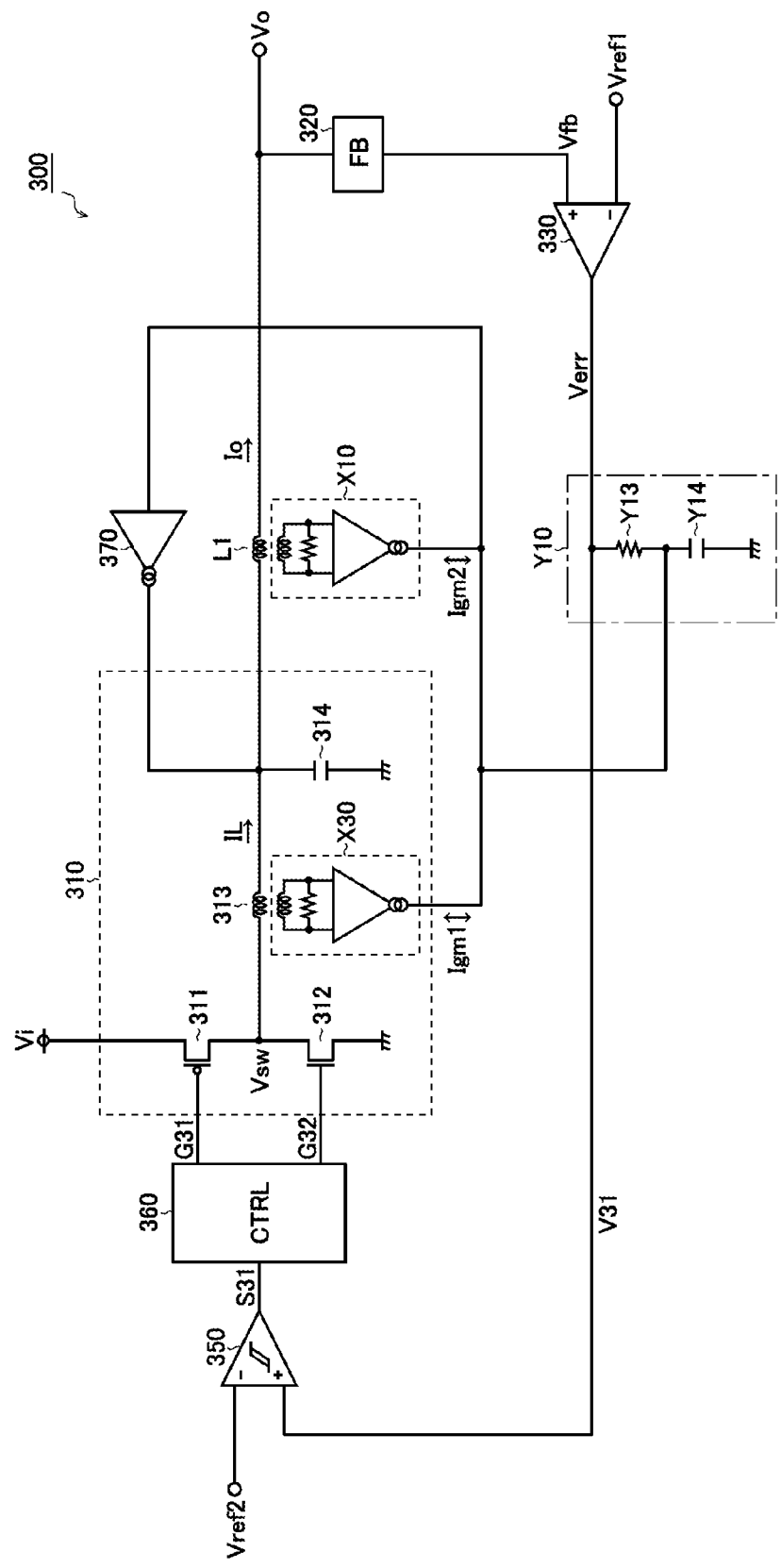
FIG. 18 is a block diagram showing a seventh embodiment of a power supply device.

FIG. 18 is a block diagram showing a seventh embodiment of the power supply device. The power supply device 300 according to the seventh embodiment is basically the same as the fifth embodiment (FIG. 15), and is characterized in including a buffer amplifier 370 that directly charges/discharges the output capacitor 314 in accordance with the detection results (=Igm1+Igm2) from the load change detector X10 and ripple detector X30.

By employing such a structure, it is possible to quickly charge/discharge the output capacitor 314 in accordance with a difference between the inductor current IL and the output current Io; accordingly, it becomes possible to reduce the difference between the best case and the worst case.

In the meantime, as to a power transistor that forms an output stage of the buffer amplifier 370, it is desirable to suitably decide its element size in light of a trade-off between a charge/discharge speed increase and a circuit scale increase.

Besides, to reduce the difference between the best case and the worst case, besides adding the buffer amplifier 370, it is also effective to raise the switching frequency fsw or pull down the inductance value of the inductor 313.

Besides the above embodiments, it is possible to add various modifications to the various technical features disclosed in the present specification without departing from the spirit of the technical creativity. For example, mutual replacement between the bipolar transistor and the MOS field effect transistor and logic level reverses of the various signals are arbitrary. In other words, it should be considered that the above embodiments are examples in all respects and are not limiting, and it should be understood that the technical scope of the present invention is not indicated by the above description of the embodiments but by the claims, and all modifications within the scope of the claims and the meaning equivalent to the claims are covered.

What is claimed is:

1. A power supply device, comprising:
   an output portion that generates an output voltage from an input voltage by means of on-off control of an output transistor and supplies the output voltage to a load,
   an output feedback controller that drives the output portion by performing output feedback control, and
   a detector that detects, by means of an electromagnetic induction method, a ripple component of a monitoring target current due to the on-off control of the output transistor,
   wherein the output feedback controller performs the output feedback control by using a detection result from the detector,
   the monitoring target current route is an inductor or output capacitor of the output portion, and
   the magnetic coupling portion is an electro-conductive cable that is wound around the inductor or the output capacitor.

2. The power supply device according to claim 1, wherein the detector includes:

a magnetic coupling portion that magnetically couples with a monitoring target current route where the monitoring target current flows, and an integrator that integrates an induced voltage or induced current which occurs in the magnetic coupling portion because of a change in the monitoring target current and outputs an integration result to the output feedback controller.

3. The power supply device according to claim 2, wherein the integrator includes:

a current amplifier that generates an amplified current in accordance with the induced voltage or induced current, and a capacitor that is charged and discharged by the amplified current, wherein a charge voltage for the capacitor is output as the detection result from the detector.

4. The power supply device according to claim 3, wherein the integrator further includes:

a resistor that is connected in parallel with the magnetic coupling portion, wherein the current amplifier generates the amplified current in accordance with a voltage across the resistor.

5. The power supply device according to claim 3, wherein the output feedback controller includes:

an error amplifier that generates an error voltage in accordance with a difference between the output voltage or a feedback voltage corresponding to the output voltage and a predetermined reference voltage, wherein the capacitor is a phase compensation capacitor of the error amplifier.

6. The power supply device according to claim 2, wherein the integrator includes:

a resistor whose first terminal is connected to a first terminal of the magnetic coupling portion, and a capacitor whose first terminal is connected to a second terminal of the resistor and whose second terminal is connected to a second terminal of the magnetic coupling portion, wherein a node voltage appearing at a connection node between the resistor and the capacitor is output as the detection result of the detector.

7. The power supply device according to claim 1, wherein the monitoring target current is a first current flowing in a pre-stage of an output capacitor of the output portion, or a second current flowing in the output capacitor.

8. The power supply device according to claim 1, wherein the monitoring target current route and the magnetic coupling portion are electric conductors adjacent to each other.

9. The power supply device according to claim 8, wherein the electric conductor is a bonding wire, a metal wiring, or a via.

10. The power supply device according to claim 1, wherein
the output portion includes:
a transformer that includes a primary winding which serves as the monitoring target current route and a secondary winding which serves as the magnetic coupling portion.

11. The power supply device according to claim 1, wherein
the output portion is of voltage step-down type, voltage step-up type, voltage step-up/-down type, or inverting type.

12. The power supply device according to claim 1, wherein the output portion is of synchronization rectification type or diode rectification type.

13. The power supply device according to claim 1, wherein the output feedback controller includes:
a comparator that receives a direct input or indirect input of a ripple voltage generated by the detector to generate a comparison signal, and
a switching controller that turns on/off the output transistor in accordance with the comparison signal.

14. The power supply device according to claim 13, wherein the detector outputs directly the ripple voltage to the comparator.

15. The power supply device according to claim 13, further comprising:
an error amplifier that generates an error voltage in accordance with a difference between the output voltage or a feedback voltage corresponding to the output voltage and a predetermined reference voltage, and
an adder that adds the ripple voltage to the error voltage and outputs a sum voltage to the comparator.

16. The power supply device according to claim 13, further comprising:
an adder that adds the ripple voltage to a predetermined voltage and outputs a sum voltage to the comparator.

17. The power supply device according to claim 13, further comprising:
an adder that adds the ripple voltage to the output voltage or to a feedback voltage corresponding to the output voltage and outputs a sum voltage to the comparator.

18. The power supply device according to claim 13, wherein the comparator has an input off-set in accordance with the ripple voltage.

19. The power supply device according to claim 13, wherein the comparator is a hysteresis comparator.

20. The power supply device according to claim 19, wherein the hysteresis comparator includes:
a first comparator that receives a first threshold value voltage to generate a first comparison signal,
a second comparator that receives a second threshold value voltage different from the first threshold value voltage to generate a second comparison signal, and
a logical operation unit that generates the comparison signal from the first comparison signal and second comparison signal.

* * * * *